Aug. 23, 1955   P. S. VENEKLASEN ET AL   2,716,187
SHIELDED CABLE SYSTEM FOR MICROPHONES AND THE LIKE
Filed Feb. 24, 1950
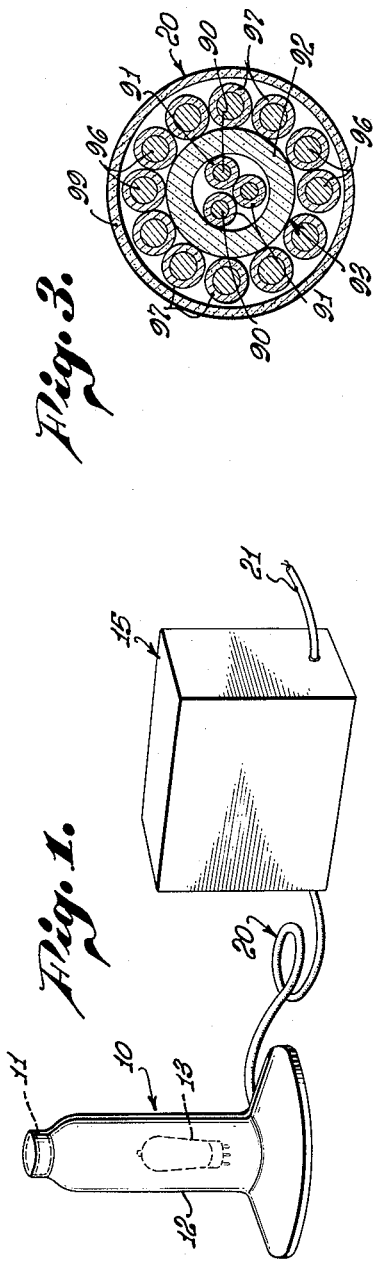
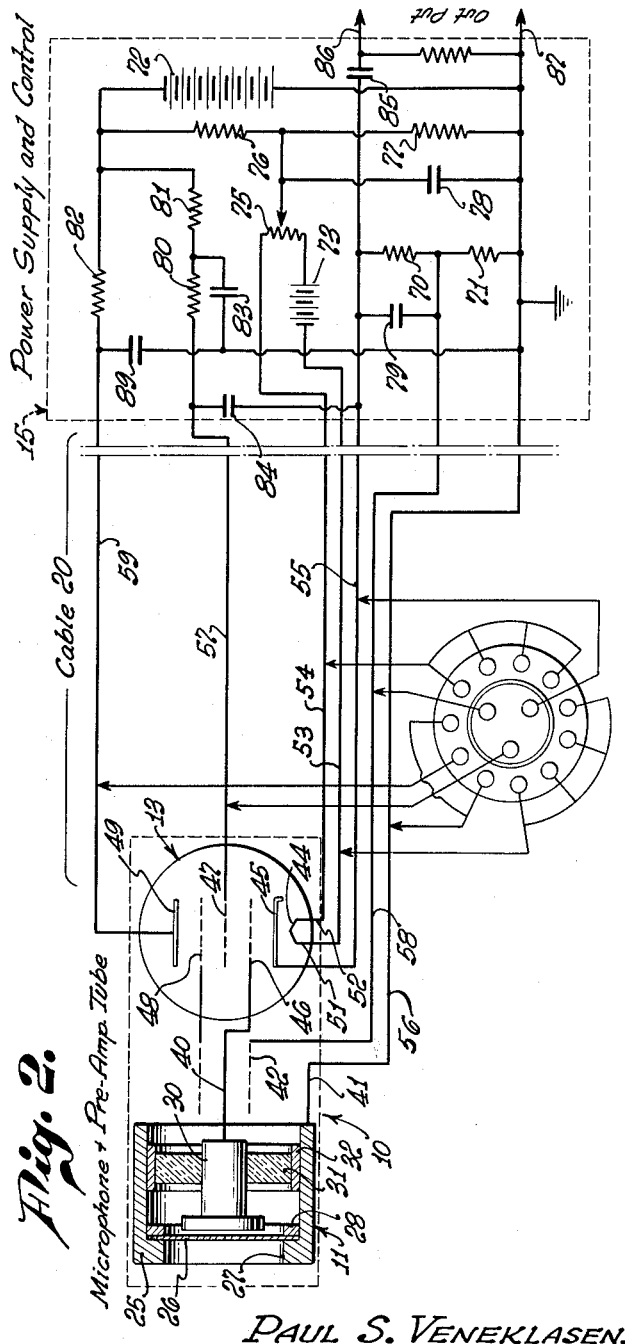
PAUL S. VENEKLASEN,
WILLIAM J. MORELAND, JR.
INVENTORS.
BY
Buckelew & Scantlebury
ATTORNEYS.

United States Patent Office 2,716,187
Patented Aug. 23, 1955

2,716,187

SHIELDED CABLE SYSTEM FOR MICROPHONES AND THE LIKE

Paul S. Veneklasen, Monrovia, and William J. Moreland, Jr., Arcadia, Calif., assignors to Altec Lansing Corporation, Los Angeles, Calif., a corporation of Delaware Application February 24, 1950, Serial No. 146,132

4 Claims. (Cl. 250—27)

This invention relates generally to electrical circuits and to improved means for effecting electrical connections in circuit systems of certain types.

The systems with which the invention is particularly concerned are those which include multiple electrical connections between two or more physically separate electrical sub-systems or sections; those connections including at least one connection between elements that are separated from effective ground by a relatively high impedance and a plurality of connections between elements that are separated from effective ground by a relatively low impedance.

In multiple connections of that type, it is common practice to employ, for the connection that is relatively isolated from ground, a conductor surrounded by a sheath of conductive material that is insulated from the conductor and directly connected to ground, that sheath forming a grounded shield. Connecting cables are available commercially which include one or more such metal-sheathed conductors, together with several insulated but unshielded conductors that are well adapted for connecting elements that are separated from ground by a relatively low impedance.

Such multiple conductor cables tend to be inconveniently heavy, bulky and stiff, due largely to the characteristics of the metal shield that surrounds certain of the wires. Particularly in certain uses, it is highly desirable that such cables be made as inconspicuous and as easy to manipulate as possible.

Furthermore, it is frequently desirable or necessary to reduce to a minimum the capacity between the shielded conductor (or conductors) and the shield, which can be accomplished best by employing a shield of relatively large internal diameter, as compared to the external diameter of the inner, shielded conductor or conductors, as in the well known coaxial cable. When additional conductors, even though themselves unshielded, are combined with such a low capacitance shielded conductor, the resulting cable is necessarily quite bulky.

A primary object of the present invention is to provide improved means and methods of making electrical connections of the type indicated, and particularly to provide such connections by means of a cable which fulfills all the usual functions of such equipment but with a minimum of weight, bulk and inconvenience in handling.

This is accomplished in accordance with the invention by constructing and connecting the cable in such a manner that those conductors having a relatively low impedance to ground act collectively to provide an effective shield for the conductors that have a relatively high impedance to ground. Thus the function of shielding is effectively performed without requiring any conductive material in the cable beyond the amount necessary to provide the essential circuit connections. By eliminating from the cable any metal which performs only or substantially only the function of shielding, the cable itself becomes smaller, lighter and more flexible than previous connecting cables that offered equivalent electrical performance. Since the same conductors in the cable perform shielding as well as current carrying functions, the copper or other conductive metal in the cable is more effectively and efficiently utilized, and less total copper is required to provide the same service.

A full understanding of the invention and of its additional objects and advantages will be had from the following description of an illustrative preferred embodiment of which the attached drawings comprise a part. In the drawings:

Fig. 1 is a perspective showing an illustrative electrical system comprising two separate sections connected in accordance with the invention;

Fig. 2 is a schematic diagram of typical circuitry associated with the sections of Fig. 1, and showing an illustrative microphone in schematic section; and Fig. 3 is a typical transverse section of a connecting cable in accordance with the invention.

The invention is here described, for purposes of illustration only, as typically embodied in an electrical system which includes a microphone of condenser type and an electrical vacuum tube acting as a preamplifier, comprising one section of the system; and circuitry for generating, regulating and controlling the input power supply to the microphone and vacuum tube and the output signal therefrom, comprising the power supply unit, which is a physically separate section of the electrical system. The resultant signal output may be taken from the power supply unit to an amplifier or similar device which comprises a separate third section; or such amplifier, including as many steps of amplification as may be desired, can be included as a physical part of the power supply unit. Since such an amplifier, in all its essential details, is well known in the art, no further description is required here.

In Fig. 1 a first section of the system is represented physically at 10, including a condenser microphone indicated schematically at 11, mounted at the top of an enclosing case 12, and a preamplifier vacuum tube, indicated at 13, which is preferably mounted in the base portion of case 12. Preamplifier tube 13 is representative of any electronic amplifier, which may include any desired number of stages; and microphone 11 represents any suitable signal source. Whereas that signal source is here shown as a part of one of the sections or sub-systems to be connected, it may itself comprise a physically separate section.

The numeral 15 indicates a typical second section of the electrical system, including in the present instance the major circuit elements which supply the necessary power for preamplifier tube 13, and also including electrical elements necessary for handling the signal output from that tube, whether that output is to be amplified or otherwise modified in unit 15, or merely transmitted for such modification to additional sections of the system. Typical electrical elements comprising power supply 15 will be described in connection with Fig. 2.

Sections 10 and 15 are electrically connected by means of a multiple conductor cable 20, which is typically illustrated in transverse section in Fig. 3. That cable preferably includes all connections between the two sections, although the showing in Fig. 1 of a single cable is not intended to imply that a plurality of separate cables may not, under certain circumstances, be used. It is sufficient for an illustrative embodiment of the present invention that a cable 20 includes a plurality of connections which have the characteristics to be described. In Fig. 1 cable 21 represents a conventional connection for transmitting the signal output of the illustrated two sections to other sub-sections of the overall electrical system. Or, if the interconnection between unit 15 and the remainder of the system requires conductors having relatively high and relatively low impedance to ground (such as might be the case, for example, if the power supply unit 15 serves both the preamplifier tube 13 and the main amplifier) then cable 21 may indicate another cable according to the invention. The invention is generally applicable to, and the described two units 10 and 15 are typical of, any two units or parts of a system, whether including amplifiers or not, whose interconnection requires a conductor or conductors with relatively high impedance to ground and other conductors with relatively low impedance to ground. And, insofar as our invention is concerned, it is immaterial whether the interconnections go to what may be regarded as a single electrically unitary circuit in either or both of the separate interconnected sections, or to two or more such circuits in either or both the separate sections.

Fig. 2 illustrates typical electrical circuitry associated with two physically separate sections, such as 10 and 15 of Fig. 1, and the various connections between those sections. The internal structure of microphone 11 is illustratively shown in schematic form in Fig. 2. A microphone case is represented at 25 with a vibratory diaphragm 26 peripherally mounted between internal flange 27 of the case and a retaining ring or equivalent structure 28. Diaphragm 26 comprises either a thin wafer of conductive material or, preferably, a thin disk of glass or quartz coated on one side with a conductive layer which is electrically connected to metal case 25. The diaphragm comprises the movable plate of a variable condenser, the fixed plate of which is provided by the closely spaced parallel face of stud 30, mounted in case 25 by means of a bushing 31 of dielectric material firmly bonded to the stud and to a mounting ring 32. A polarizing voltage is applied between the plates of the condenser by conductor 40, connected to stud 30, and by conductor 41, which connects case 25 to ground.

Preamplifier vacuum tube 13 is shown schematically in conventional form in Fig. 2, connected for operation as a cathode follower. The tube cathode 45 is connected to ground via conductor 55 and load resistors 70 and 71. A positive operating voltage is applied to the tube plate 49 via conductor 59 and resistor 82 from a source of voltage represented as battery 72. A low impedance alternating current connection is provided from plate conductor 59 to ground by the relatively large by-pass condenser 89.

Cathode heater 44 has its two terminals 51 and 52 connected via leads 53 and 54 across a source of direct current voltage, represented by battery 73, and the low resistance winding of potentiometer 75. The movable contact of potentiometer 75 is connected to the junction between resistors 76 and 77, which form a voltage divider across battery 72, facilitating adjustment of the average heater voltage with respect to tube cathode 45. A relatively low impedance by-pass connection for alternating currents is provided between heater 44 and ground by the relatively large condenser 78, connected between ground and potentiometer 75. Power sources 72 and 73 may be considered alternatively as representing batteries or suitable combinations of alternating current source, rectifiers and filters.

The ground connection from microphone lead 41 is made via conductor 56. Microphone lead 40 goes directly to control grid 46 of tube 13, the polarization voltage of the microphone being maintained by the grid current in the tube at a value substantially equal to the voltage across load resistors 70 and 71. Suppressor grid 48 of tube 13 and the shield 42 which surrounds lead 40, are connected via conductor 58 to the junction of voltage dividing load resistors 70 and 71 and via by pass condenser 79 to cathode conductor 55. Screen grid 47 is connected via conductor 57 through series resistors 80 and 81 to the positive side of voltage source 72 and is by passed via condenser 84 to the cathode and via condenser 83 from the junction of resistors 80 and 81 to ground.

The tube output is taken between cathode 45 and ground, and is transmitted from the cathode via conductor 55 and condenser 85 to output terminal 86. The final output from the cathode is taken across terminal 86 and ground terminal 87 by a suitable cable, as indicated at 21 in Fig. 1.

It will be seen that in this illustrative showing the conductors 53 through 59 are of two distinct types, those which have a relatively high impedance to ground and those whose impedance to ground is relatively low. In the first group are conductor 55 which carries the output signal from cathode 45 and which is separated from ground by the relatively high load resistor 71 of the tube; conductor 58 which determines the voltage of shield 42 and of suppressor grid 48, and is also separated from ground by resistor 71; and conductor 57 from shield grid 47, whose impedance to ground is substantially that of the relatively high resistor 80. Whereas those three conductors have relatively high impedance to ground, the impedance between them is low, being determined primarily by condensers 79 and 84, so that they act in some respects as a single conductor in carrying the output signal from the cathode. Conductor 59 from plate 49 has the relatively low impedance path to ground through condenser 89 for alternating current voltages and also the path via resistor 82 and battery 72; conductors 53 and 54, which carry a relatively large direct current to heater 44, have a low impedance to ground via condenser 78, and conductor 56 is at ground potential.

In accordance with the invention the conductors having relatively low impedance to ground are utilized to shield the conductors having relatively high impedance to ground. A suitable type of cable by which that may be accomplished is illustrated in Fig. 3. The actual number of conductors shown in Fig. 3 and their described arrangement are, of course, subject to wide variations in accordance with the requirements of the particular circuitry in which the cable is to be used. However, the essential characteristics required for carrying out the invention are illustratively shown here.

Three mutually insulated conductors are shown at 90 with relatively thin insulating coatings 91. Those conductors are centrally located within cable 20 and are preferably, although not necessarily, collectively surrounded by a relatively thick sheath 92 having high insulative properties. The central conductors 90, form a central core of the cable, which may, alternatively, contain only a single conductor, or any required number of conductors. That core, denoted generally by the numeral 93, is completely surrounded by a plurality of peripheral conductors 96, which are spaced from each other and also mutually insulated as by insulative coatings 97. Sheath 92, if used, may be considered either as forming a part of cable core 93 or as being distinct from that core. Accordingly, the term "cable core," is intended to be interpreted in either of those senses, unless the context clearly indicates which sense is intended. An enclosing casing 99 preferably binds the entire cable together and protects it against abrasion. Casing 99 is preferably of relatively soft dielectric material, so that it interferes as little as possible with the inherently high flexibility of the cable. Sheath 92, if used, may be of harder dielectric material, since its relatively small diameter limits its stiffness. Its wall is preferably thick enough, however, to provide a relatively wide spacing between the wires 90 of the core and the metal of the peripheral conductors 96. Sheathes 92 and 99, although referred to here as distinct elements, may, of course, be formed as integral parts of insulating layers 91 or 97, or both.

Sheath 92, or its equivalent, in addition to providing insulation of the core conductors, acts as a spacer, separating peripheral conductors 96 relatively widely from central conductors 90 of the cable core. The capacitance between the conductors of the two groups is thus greatly reduced, and at the same time the effectiveness of the spaced conductors 96 as a shield for the cable core is improved. When core 93 includes more than one conductor 90, the latter are preferably arranged as close together as is feasible in order to increase the spacing between each of them and peripheral conductors 96. In the preferred form of the cable, as is clear from Fig. 3, the sheath 92 is so thick that the spacing of each peripheral conductor from the central conductors is quite large with respect to the mutual spacings of the peripheral conductors. In a typical cable, and for illustration only, the thickness of dielectric separating the central from the peripheral conductors is about three times that separating adjacent peripheral conductors.

A typical manner of connection of the various conductors contained in cable 20, whereby the necessary conductive and shielding characteristics for the conductors 53 to 59 are provided, is illustrated schematically in Fig. 2. The three central conductors 90 of cable 20 are utilized as conductors 55, 57 and 58, respectively, which have relatively high impedance to ground. One of the eleven peripheral conductors of cable 20 provides conductor 59, which has a relatively low impedance to ground and which carries a relatively high voltage. Ground connection 56 is preferably provided by the two peripheral conductors of cable 20 which are oppositely adjacent conductor 59. Those ground connections thereby prevent any leakage from high voltage plate conductor 59 to other parts of the system. Connections 53 and 54 to tube heater 44 carry a relatively large current which, since all of the conductors are preferably relatively small, requires more than one of the conductors 96 of the cable. Each of the connections 53 and 54 is effected in the present embodiment by means of four of the peripheral conductors 96 of the cable, connected in parallel. That division of the current carrying function of the heater connections among eight physically separate and suitably arranged conductors provides very much more effective shielding of the conductors in the cable core than could be provided by two relatively thick heater conductors.

With the connections illustrated, the conductors 53, 54, 56 and 59 (53 and 54 each comprising a plurality of circumferentially spaced wires) provide effective shielding of the conductors 55, 57 and 58. Each of the former group of conductors either has intrinsically a low impedance path to ground, or is provided with such a path to increase the effectiveness of the shielding action. Thus, for example, conductor 56 is directly grounded; and condenser 78 provides a low impedance path from conductors 53 and 54 to ground.

The distribution of the various electrical elements between the two sections 10 and 15 of the system need not be that illustratively shown in Fig. 2. As an example, the three elements 70, 71 and 79 may be physically located in the microphone and tube unit 10 rather than in power supply 15, as shown. If that placement is preferred, the electrical connections of the named elements may remain effectively the same, the connections to conductors 55 and 56 being made at the microphone end of those conductors instead of at the power supply end. Conductor 58, extending from shield 42 to the components 70, 71 and 79, then lies wholly within section 10, and the corresponding core conductor of the cable is thereby either released for other service or may be omitted from the cable.

Similarly, the elements 80 through 83 and 89 may be physically located either in power supply unit 15, as illustrated, or transferred as a group to section 10 of the system. In the latter instance the conductor 57 need not extend through cable 20, so that the core conductor which acts as conductor 57 in the preferred embodiment is either released for other service or may be omitted from the cable. If both groups of elements referred to are transferred physically to section 10 of the system, as just indicated, the resulting system is typical of those in which the entire signal is carried by a single core conductor (55), and in which no additional shielded conductors are required in the cable.

For clarity of illustration, certain electrical elements that are useful in a practical microphone system are omitted in Fig. 2. The detailed circuitry shown may be modified in various respects, as is well known in the art, to provide additional functions (such, for example, as equalization of the signal output), or to provide equivalent functions in another manner (for example, by utilizing plate 49 rather than cathode 45 as output element of the tube). The present invention is useful not only in connection with a wide variety of such microphone circuit systems, but also in any electrical system having multiple connections of the broad types described. A single cable, for example, may service elements, at one end or at both ends, that are associated with two or more quite distinct electrical systems. Furthermore the shielded conductor or conductors having relatively high impedance to ground need not necessarily be immediately associated in the same functional electrical system with the conductors that have low impedance to ground and that provide the shield. The scope of the invention is not intended to be limited by the particular system selected for illustration, but is defined by the following claims.

We claim:

1. In an electrical system of the type that includes two mutually spaced stations and a multiple conductor cable connecting the two stations; in combination, an inner conductor positioned centrally in the cable and connected in the system as a signal-carrying conductor having a relatively high impedance to ground and requiring shielding from external alternating current electromagnetic disturbances, shielding means acting to shield the inner conductor from said disturbances and comprising an array of mutually spaced outer conductors angularly distributed about the inner conductor and forming a screen effectively surrounding that conductor, a plurality of the outer conductors being connected in parallel in a circuit that normally carries direct current between the two stations at a direct current potential appreciably different from ground potential, the impedance for direct currents between those outer conductors and ground being relatively high, and a capacitor connected between the said circuit and ground and providing a relatively low impedance path for alternating currents between the parallel-connected conductors and ground, the last said conductors performing substantial shielding action for the inner conductor by virtue of the said capacitor.

2. In an electrical system of the type that includes two mutually spaced stations and a multiple conductor cable connecting the two stations; in combination, an inner conductor positioned centrally in the cable and connected in the system as a signal-carrying conductor having a relatively high impedance to ground and requiring shielding from external alternating current electromagnetic disturbances, shielding means acting to shield the inner conductor from said disturbances and comprising an array of mutually spaced outer conductors angularly distributed about the inner conductor and forming a screen effectively surrounding that conductor, a plurality of the outer conductors being connected in parallel in a circuit that normally carries a current between the two stations at a potential appreciably different from ground potential, and circuit means connected between the said circuit and ground and providing a low impedance path for alternating currents between the parallel-connected conductors and ground, the last said conductors performing substantial shielding action for the inner conductor by virtue of the said circuit means.

3. In an electrical system of the type that includes two mutually spaced stations and a multiple conductor cable connecting the two stations, one of the stations including a vacuum tube having a signal output connection and having a cathode heater with two heater terminals, and the other station including transmitting means for the output signal from the tube and a source of power for the cathode heater; in combination, an inner conductor positioned centrally in the cable and connected in the system between the signal output connection and the transmitting means to carry the output signal from the tube, shielding means acting to shield the inner conductor from external alternating current electromagnetic disturbances, said shielding means comprising an array of mutually spaced outer conductors angularly distributed in the cable about the inner conductor and forming a screen effectively surrounding that conductor, a plurality of the outer conductors being connected in the system in two groups, the conductors of the said groups being connected in parallel between the respective cathode heater terminals and the heater power supply and forming a closed heater circuit normally carrying direct current power for the heater at a direct current potential appreciably different from ground potential the impedance for direct currents between the heater circuit and ground being relatively high, and capacitive circuit means of relatively low impedance for alternating currents connected between the heater circuit and ground, the conductors of the said two groups performing substantial shielding action for the inner conductor by virtue of the last said circuit means.

4. In an electrical system of the type that includes two mutually spaced stations and a multiple conductor cable connecting the two stations, one of the stations including a vacuum tube having a cathode and a cathode heater insulated from the cathode and having two terminals, the tube being connected as a cathode follower with a relatively high load resistance between the cathode and ground, the potential of the cathode being appreciably different from ground potential, and the other station including transmitting means for the output signal from the tube and a source of power for the cathode heater; in combination, a conductor positioned centrally in the cable and connected in the system between the cathode and the transmitting means to carry the output signal from the tube cathode, a plurality of peripheral conductors mutually spaced in the cable in a peripheral formation that spacedly surrounds the central conductor and forms the outermost conductive layer of the cable, the peripheral conductors being connected in the system in two groups, the conductors of the said groups being connected in parallel between the respective cathode heater terminals and the heater power supply and forming a closed heater circuit, the heater power supply being adapted to provide direct current power to the heater circuit, circuit means connected between the heater circuit and ground and providing therebetween a relatively high resistance, the said circuit means acting to hold the heater circuit at substantially the potential of the cathode, and a capacitor connected between the heater circuit and ground and providing therebetween a relatively low impedance for alternating currents, the peripheral conductors being thereby substantially grounded for alternating currents, and being capable of effectively shielding the central conductor from external alternating current electromagnetic disturbances.

References Cited in the file of this patent

UNITED STATES PATENTS

| | | |
|---|---|---|
| 437,311 | McCluer | Sept. 30, 1890 |
| 1,733,194 | Harris | Oct. 29, 1929 |
| 1,753,079 | Zapf | Apr. 1, 1930 |
| 1,855,288 | Green | Apr. 26, 1932 |
| 1,861,851 | Gilbert | June 7, 1932 |
| 1,917,061 | Quarles | July 4, 1933 |
| 2,072,712 | Fischer | Mar. 2, 1937 |
| 2,163,235 | Chatham | June 20, 1939 |
| 2,180,731 | Dickinson | Nov. 21, 1939 |
| 2,400,751 | Gage | May 21, 1946 |
| 2,442,805 | Gilson | June 8, 1948 |

FOREIGN PATENTS

| | | |
|---|---|---|
| 379,684 | Great Britain | Nov. 3, 1927 |
| 331,639 | Great Britain | July 10, 1930 |